(12) United States Patent
Solomon et al.

(10) Patent No.: US 8,109,007 B2
(45) Date of Patent: Feb. 7, 2012

(54) OBJECT PROFILE SENSING

(75) Inventors: Joseph H. Solomon, River Forest, IL (US); Mitra J. Hartmann, Evanston, IL (US); Christopher L. Schroeder, Chicago, IL (US)

(73) Assignee: Northwestern University, Evanston, IL (US)

( * ) Notice: Subject to any disclaimer, the term of this patent is extended or adjusted under 35 U.S.C. 154(b) by 409 days.

(21) Appl. No.: 12/455,389

(22) Filed: Jun. 1, 2009

(65) Prior Publication Data

US 2010/0071222 A1   Mar. 25, 2010

Related U.S. Application Data

(63) Continuation-in-part of application No. 11/906,751, filed on Oct. 3, 2007, now Pat. No. 7,774,951.

(51) Int. Cl.
 *G01B 5/00* (2006.01)
 *G01B 5/20* (2006.01)
 *G01B 21/00* (2006.01)
 *G01B 21/20* (2006.01)

(52) U.S. Cl. ............. 33/701; 33/551; 33/552; 73/105; 702/168

(58) Field of Classification Search .............. 33/501, 33/548, 549, 551, 552, 553, 554, 555, 700, 33/701, 832, 833, DIG. 13; 73/104, 105, 73/661; 702/155, 157, 158, 167, 168
See application file for complete search history.

(56) References Cited

U.S. PATENT DOCUMENTS

| | | | | |
|---|---|---|---|---|
| 6,286,226 | B1* | 9/2001 | Jin | 33/706 |
| 7,278,297 | B2* | 10/2007 | Bauza et al. | 73/105 |
| 2002/0084410 | A1* | 7/2002 | Colbert et al. | 250/306 |
| 2008/0202222 | A1* | 8/2008 | Woody et al. | 73/105 |
| 2008/0264185 | A1* | 10/2008 | Kobayashi et al. | 73/862.637 |
| 2011/0029470 | A1* | 2/2011 | Hartmann et al. | 706/16 |

FOREIGN PATENT DOCUMENTS

JP   2002116101 A  *  4/2002

OTHER PUBLICATIONS

T.N. Clements, C.D. Rahn, "Three-Dimensional Contact Imaging with an Actuated Whisker," IEEE Trans. Robot., vol. 22, No. 4, pp. 844-848, Aug. 2006.

Kaneko, N. Kanayama and T. Tsuji, "Active Antenna for Contact Sensing,"IEEE Trans. On Robotics and Automation, vol. 14, No. 2, pp. 278-291, Apr. 1998.

D. Kim and R. Möller, "Biomimetic whiskers for shape recognition," Robotics and Autonomous Systems, vol. 55, pp. 229-243, Mar. 2007.

(Continued)

*Primary Examiner* — Richard A. Smith

(57) ABSTRACT

A method for sensing an object profile shape involves relatively sweeping (whisking or translating) in angular or translational increments an elongated whisker element having a deflectable cantilever region and an object so that the cantilever region bends as a result of sliding along an object periphery. The moment (torque) at a base region of the whisker element as a result of the bending is determined. The method then iteratively determines successive contact point locations on the object periphery based on small successive increments in angle or position of the whisker element and the sensed moment (torque).

13 Claims, 10 Drawing Sheets

OTHER PUBLICATIONS

R.A. Russell, "Using Tactile Whiskers to Measure Surface Contours," in Proc.IEEE Inter. Conf. on Robotics and Automation, pp. 1295-1299, May 1992.

G. Scholz and C. Rahn, "Profile Sensing with an Actuated Whisker," IEEE Trans. on Robotics and Automation, vol. 20, No. 1, pp. 124-127, 2004.

R.B. Towal and M.J.Z. Hartmann, "Variability in velocity profiles during free-air whisking behavior of unrestrained rats," Journal of Neurophysiology, vol. 100, pp. 740-752, 2008.

T. Tsujimura and T. Yabuta, "Object Detection by Tactile Sensing Method Employing Force/Torque Information," IEEE Trans. on Robotics and Automation, vol. 5, No. 4, pp. 444-450,1989.

N. Ueno, M. Svinin, and M. Kaneko, "Dynamic Contact Sensing by Flexible Beam," IEEE/ASME Transactions on Mechatronics, vol. 3, No. 4, pp. 254-264, 1998.

J. Wilson and Z. Chen, "A Whisker Probe System for Shape Perception of Solids," Transactions of the ASME, vol. 117, pp. 104-108, Mar. 1995.

* cited by examiner

OBJECT PROFILE SENSING

RELATED APPLICATION

This application is a continuation-in-part of U.S. Ser. No. 11/906,751 filed Oct. 3, 2007 now U.S. Pat. No. 7,774,951, the disclosure of which are incorporated herein by reference.

CONTRACTUAL ORIGIN OF THE INVENTION

This invention was made with government support under IOB0446391 and IOS0818414 awarded by National Science Foundation and NAS7-03001 awarded by National Aeronautics Space Administration. The government has certain rights in the invention.

FIELD OF THE INVENTION

The present invention provides a method of sensing or determining object profile shape using a whisker sweeping method that allows continued estimation of contact point beyond an initial contact so as to provide maximum profile shape information per whisk.

BACKGROUND OF THE INVENTION

Mammalian whiskers have attracted increasing interest from engineers seeking to imitate their numerous desirable sensing properties. Whiskers are physically robust, mechanically simple, and yet can precisely extract object shape, texture and the velocity of fluid flow. The diverse capabilities of whiskers are amply demonstrated by the animals that use them to perform difficult behavioral tasks; for example, seals can track hydrodynamic trails [1] and rats can distinguish small differences in aperture width [2]. Robotic whiskers have been used for various types of sensing tasks (for a detailed review, see [3]), and several recent studies have specifically addressed the issue of three-dimensional (3D) feature extraction, wherein the goal is to infer the shape of an object by repeated contact with one or more whiskers. These studies have generally taken one of two approaches: whisker "tapping" or whisker "sweeping."

The first approach—whisker tapping—is to rotate or translate the whisker(s) against an object by a small angle and infer where along the length of the whisker initial contact occurred (radial distance extraction). Using this information, along with information about the angle of initial contact and location of the whisker base, allows estimation of the contact point location in 3D space for each whisker/whisk.

Whisker tapping has been relatively well studied. Tsujimura and Yabuta derived and demonstrated a general method of estimating contact point location of a stiff probe pressing against an object using a six-axis force/torque sensor [4]. Ueno et al. measured vibration frequencies at the base of a flexible beam using a torque sensor to estimate contact point position [5]. Kaneko et al. used a two-axis actuator, two-axis torque sensor and a flexible beam to determine contact positions along an object based on the rotational compliance [6]. Clements and Rahn applied a large angle elastica model as the basis for determining contact point location with a two-axis actuator, flexible beam and six-axis force/torque sensor [7]. Kim and Möller attached multiple flexible beams with two-axis torque sensors to an actuated support plate, showing that whisker arrays can provide basic object shape information in a single whisk [8]. Detailed shape information can be extracted by using a whisker array and combining data from several whisks and accounting for lateral slip of the whiskers along the object [3, 9].

The second approach—whisker sweeping—involves moving the whisker along or against the object far past the location of initial contact in order to estimate a collection of contact point locations as the whisker slips along the surface. Whisker sweeping has received less attention in the literature than tapping. Russell swept the tip of a flexible curved beam with a binary (touch or no-touch) sensor along objects with a Puma robot to measure their profile [10]. Wilson and Chen used a pneumatic bellow tube actuation system and closed-loop control to sweep the tip of a flexible beam with a 2D torque sensor along objects and estimate their profiles [11]. Scholz & Rahn rotated a flexible beam equipped with a six-axis force/torque load cell against objects and used a large-angle elastica model to repeatedly compute the entire whisker shape and contact point, providing an accurate 2D object profile measurement with a single whisk [12]. Critical differences between this method and that of the present invention will become apparent.

SUMMARY OF THE INVENTION

The present invention provides a method of sensing or determining object profile shape using a robotic whisker in a sweeping mode that allows continued estimation of contact point beyond an initial contact so as to provide maximum profile shape information per whisk (sweep). In an illustrative embodiment of the invention, a method for sensing object profile shape comprises relatively sweeping (whisking or translating) in angular or translational increments an elongated whisker element having a deflectable cantilever region and an object so that the cantilever bends as a result of sliding along an object periphery, determining moment at a base region of the whisker element as a result of the bending, and iteratively determining (inferring) successive contact point locations on the object periphery based on small successive increments in whisker element displacement and sensed moment. The method determines contact points on the object by iteratively inferring position changes and thus successive contact locations based on small successive increments in angle of the whisker element and sensed moment using only measurement of moment (torque). The method is extremely efficient, involving only the evaluation of a simple algebraic expression and two polynomials per time step. Also, because the whisker follicle needs to only measure moment, it can be based on a single strain gage or other basic technology.

The present invention can be practiced to as an effective, efficient and easy-to-implement method for obtaining object profile shape information over a single whisk with a robotic whisker. The fact that only moment needs to be measured allows it to be implemented with small, inexpensive torque sensors (e.g. strain gages), making it highly amenable to implementation on an array of robotic whiskers. The algorithm employed in practice of the invention is robust with regard to sensor noise and object friction.

The invention also envisions in another embodiment a method for sensing curvature of an object, comprising relatively sweeping at a known velocity an elongated whisker element having a deflectable cantilever region and an object so that the cantilever region bends as a result of sliding on an object periphery, determining successive radial distances between a base region of the whisker element and a point of contact with the object, and determining curvature of the object using the successive radial distances and known velocity of sweeping.

Still another method embodiment of the invention can used to determine future points of contact between the whisker element and the object by linear approximation using differences of the radial distances and the known velocity at preceding points of contact there between. A still further method embodiment can be used to determine future points of contact between the whisker element and the object by quadratic approximation using curvatures of the object at preceding points of contact there between.

Further advantages and details of the present invention will become more readily apparent from the following detailed description taken with the following drawings.

DETAILED DESCRIPTION OF THE INVENTION

An embodiment of the present invention is based on incrementally inferring the change in contact point location through continuous measurement of torque (i.e., bending moment) at the whisker base. Each whisker rotates or translates about its base, where the bending moment is measured. It can be convenient, but it is not necessary, to allow all whiskers to rotate or translate in unison, thus allowing for a simple array design that requires only a single motor for actuation. Copending application Ser. No. 11/906,751 filed Oct. 3, 2007, discloses a method for performing initial contact point measurement under such conditions or constraints. The present invention provides a method that extends the method of this copending application Ser. No. 11/906,751 and will allow continued estimation of contact point beyond initial contact with an object using only measurement of moment (torque) to iteratively infer successive contact point locations, thus providing the maximum amount of available shape information per whisk.

Lateral Slip, Longitudinal Slip and Axial Slip

Figure 1A:
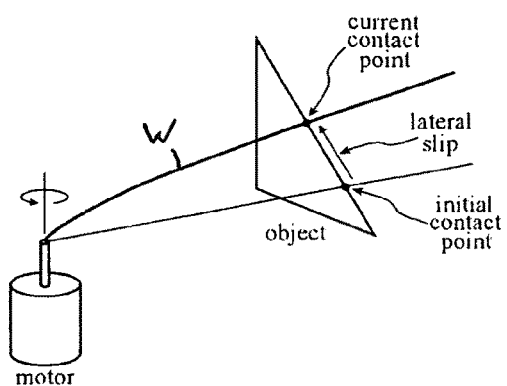
FIGS. 1a and 1b shows two types of whisker slip: (1a) lateral slip and (1b) longitudinal slip. Note that although here they are depicted independently, they can in general occur simultaneously.
Figure 1B:
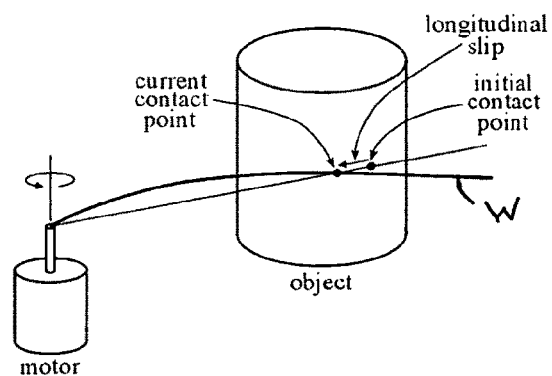

There are two distinct ways that a whisker can slip along an object. Lateral slip occurs when the object surface at the contact point is slanted relative to the plane of rotation and the angle of the friction cone is not large enough to prevent out-of-plane movement, as depicted in FIG. 1(a) [3]. Lateral slip can generate significant errors in the estimate of radial distance, and methods have therefore been devised either to prevent it from occurring by reorienting the plane of rotation [6, 7], or to passively account for it [3]. The latter method is most accurate when an estimate of surface friction is available. Longitudinal slip occurs when the curvature of the object within the plane of rotation at the contact point is finite (not a point-object or an object's corner), as depicted in FIG. 1(b). Kaneko et al. showed that (in the absence of lateral slip) longitudinal slip has a small effect on radial distance extraction unless the object curvature at the contact point is very small or the contact point is very close to the base [6]. Conveniently, longitudinal slip affords the opportunity to sense additional contact points as the whisker slips along the object periphery, providing further information about object shape over a single whisk. The algorithm presented here accomplishes this task.

It is important to understand that the above definitions of lateral and longitudinal slip describe the movement of the contact point along the object in Euclidean space. The contact point can also move along the whisker, even in the absence of lateral and/or longitudinal slip. For example, if a whisker rotates in a plane against a point object, the location of contact on the whisker will change, but the location of object contact will remain constant. This type of contact-point movement on the whisker we term axial slip. In the analyses that follow, we are concerned primarily with longitudinal slip, as it directly determines the regions of the object being sampled.

Determining the Initial Contact Point

We model an artificial whisker sensor as a thin, straight, cylindrical, flexible beam or whisker W (e.g., spring steel or Nitinol wire) with a torque sensor at the base B, situated to measure the beam's bending moment at its axis of rotation, which is fixed. In addition, we assume that the environment contains only static, convex objects that are rigid relative to the whisker W, that the whisker bends only within its plane of rotation (no lateral slip), and that contact occurs at a discrete point along the whisker length, and not at the tip, although these restrictions can be lessened as described below.

The sensing process begins with the whisker W freely rotating in the air. When a small moment threshold $M_{thresh}$ is exceeded, indicating initial object contact, the first step is to record the current absolute whisker base angle $\psi_{contact}$ (i.e., the encoder angle), and estimate the radial distance to the first contact point $r_0$, using:

$$r_0 = 3EI \frac{\alpha_0}{M_0} \qquad (1)$$

where E is the Young's modulus, I is the area moment of inertia, $\alpha_0$ is a small pushing angle (typically about 3°) beyond initial contact (where $M_{thresh}$ is reached), and $M_0$ is the moment sensed in the plane of rotation at the whisker base. This equation has shown to be able to reliably estimate radial distance with very high precision [6]. Calculation of the contact point location in Cartesian coordinates with respect to the base is useful:

$$\begin{bmatrix} d_{x,0} \\ d_{y,0} \end{bmatrix} = \begin{bmatrix} r_0 \\ -r_0 \cdot \alpha_0 \end{bmatrix}. \qquad (2)$$

Figure 2:
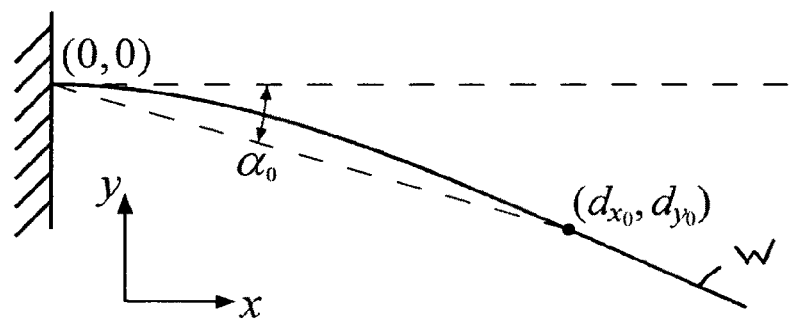
FIG. 2 illustrates the geometry of whisker after rotation by $\alpha_0$. The x-axis of the coordinate system is coincident with the line tangent to the whisker base. The magnitude of $\alpha_0$ is exaggerated here, as 3° is typically sufficient.

Note that Eq. (2) assumes $\alpha_0$ is small, so that $\sin \alpha_0 \approx \alpha_0$. FIG. 2 shows the state of the whisker after measurement of the first contact point. As the whisker continues to rotate against the object, the contact point will slip along the object in a way that depends on the local shape of the object. The sweeping algorithm described herein is designed to infer that local shape based on the continued measurement of torque, as outlined in the following description.

Determining Additional Contact Points Using the Sweeping Algorithm

Figure 3:
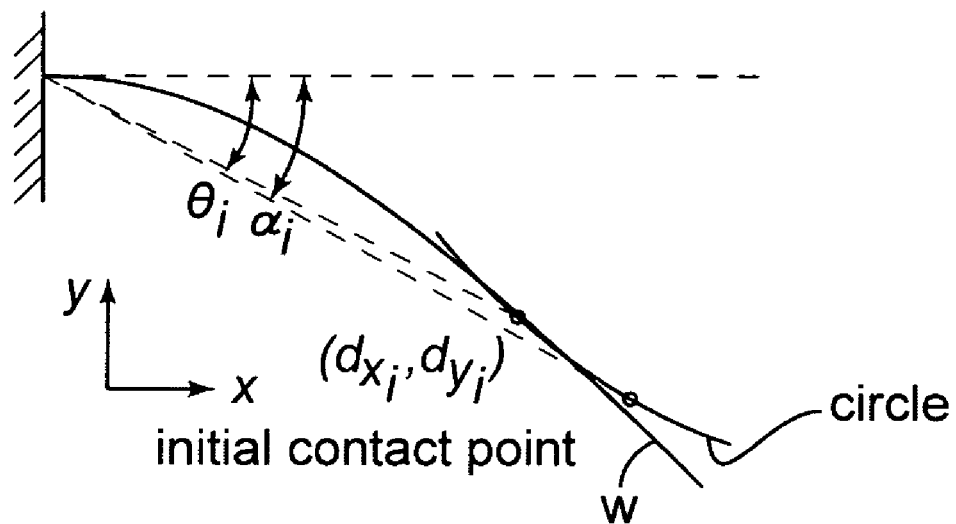
FIG. 3 illustrates the difference between $\alpha$ and $\theta$. The whisker rotates by $\alpha_i=30°$ against a circle of radius 1 at an initial radial contact distance $r_0=1$. Due to longitudinal slip, the radial contact distance significantly decreases (becoming $r_i=0.82$), and the deflection angle increases at a slightly slower rate than does $\alpha$ (becoming $\theta_i=28.3°$). These numbers were numerically generated using the method described in Appendix, part 2.

The basic premise of the algorithm is that given the current (iteration i, i≧0) estimated contact point location relative to the base ($d_{x,i}$, $d_{y,i}$) or ($r_i$, $\theta_i$) in polar coordinates), its new position after a small incremental rotation $d\alpha$ can be inferred based on the new measured moment $M_{i+1}$. Throughout the derivation below, it is important to note that there are two angles of interest: $\theta$, and $\alpha$. Deflection angle $\theta$ is defined as the angle between the line tangent to the whisker base and the line that connects the whisker base to the current contact point, that is, $$\theta_i = \tan^{-1}\left(\frac{d_{y,i}}{d_{x,i}}\right),$$

where the negative sign ensures that $\theta$ is a positive quantity. Rotation angle $\alpha$ is the total angle that the whisker has rotated since object contact. In general, $\theta$ and $\alpha$ differ slightly, as depicted in FIG. 3. However, in the absence of longitudinal slip, they are identical. Longitudinal slip does not occur when the contact point has infinite curvature (e.g., a point-object or the sharp corner of an object) and is negligible during the initial rotation (i.e. $\theta_0 \approx \alpha_0$) unless the object curvature at the contact point is very small and/or the contact point is very close to the base, as mentioned earlier.

Figure 4:
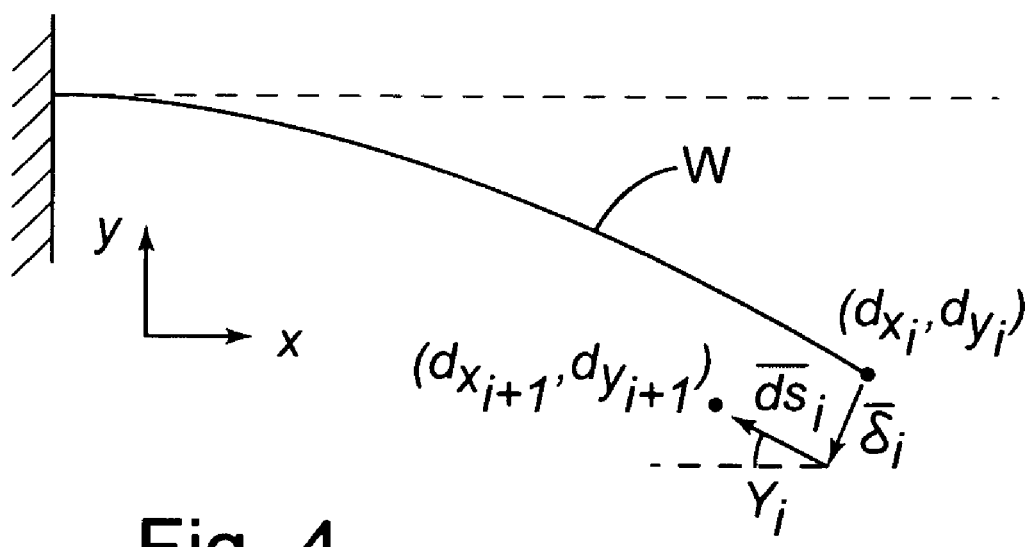
FIG. 4 illustrates a single iteration of the sweeping algorithm. The magnitude of $d\theta$ is exaggerated here, as ~1° is typically used.

The derivation begins by decomposing the translation of the contact point during a single iteration into two non-orthogonal components. The first component is a nominal deflection $\overline{\delta}_i$ tangent to the imaginary circle centered at the base and intersecting the current contact point ($d_{x,i}$, $d_{y,i}$). The second component $\overline{ds}_i$ represents the longitudinal slip, occurring parallel to the longitudinal axis at the contact point (angle $\gamma_i$) and pointing towards the base. These components are depicted in FIG. 4 and can be expressed as:

$$\begin{bmatrix} d_{x,i+1} \\ d_{y,i+1} \end{bmatrix} = \begin{bmatrix} d_{x,i} \\ d_{y,i} \end{bmatrix} + \overline{\delta}_i + \overline{ds}_i. \qquad (3)$$

The result of the $\overline{\delta}_i$ component is immediately evident, shifting the contact point by magnitude $r_i \cdot d\alpha$ concentric with the base, allowing us to write $$\overline{\delta}_i = -r_i \cdot d\alpha \cdot \begin{bmatrix} \sin\theta_i \\ \cos\theta_i \end{bmatrix}. \qquad (4)$$

To find the direction and magnitude of $\overline{ds}_i$ is more difficult. These two problems will now be treated independently.

As stated earlier, $\overline{ds}_i$ is oriented parallel to the longitudinal axis of the whisker at the contact point, at contact angle $\gamma_i$. For small $\theta$, it is straightforward to show using Euler-Bernoulli beam theory applied to the classical model of a cantilever beam with concentrated end load, that $$\gamma \approx \frac{3}{2}\theta \qquad (5)$$

for small deflections (see Appendix, part 1). However, assumptions of linearity are violated for angles larger than about 10°, and hence we turn to a numerical elastica model to compute the relation between $\gamma$ and $\theta$ for larger deflections.

The model considers a static cantilever beam divided into n nodes, with a concentrated load F at arc length $s_F=1$ along the beam. Friction is assumed to be zero, and the force therefore acts perpendicular to the longitudinal axis at the force location. Starting at node 1 where the force is applied, the shape of the beam is iteratively computed node-by-node towards node n at the base using a version of the Euler-Bernoulli equation. Repeating this procedure for a range of forces provides a sequence of beam shapes for increasingly large deflections, with units automatically normalized by E, I and $s_F$. The resulting table can be efficiently interpolated to generate the beam shape, curvature or moment at the base, and contact angle $\gamma$ for various methods of query, including $(d_x, d_y)$, $(r, \theta)$, and $(s_F, F, EI)$. Details can be found in Appendix, part 2.

Figure 5A:
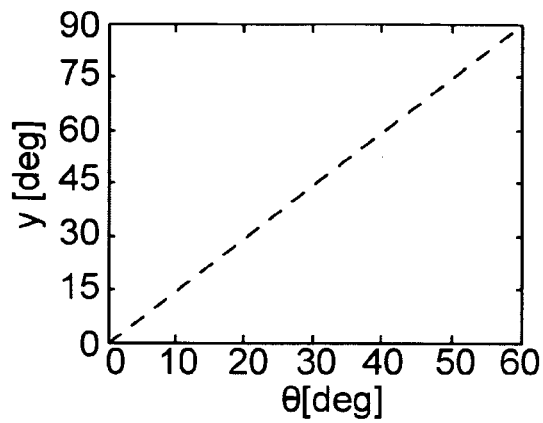
FIG. 5a shows the relationship between deflection angle $\theta$ and tip angle $\gamma$ for a cantilever beam with concentrated end load.
Figure 5B:
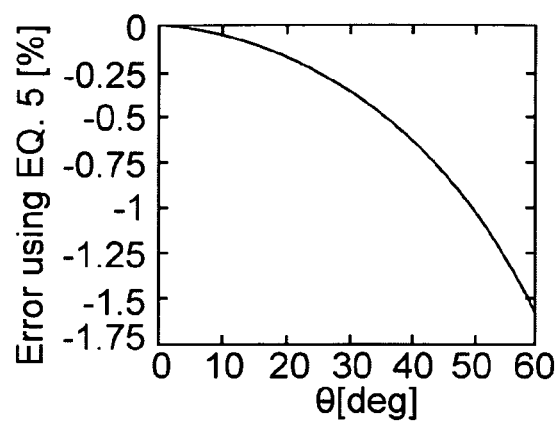
FIG. 5b shows the error incurred using Eq. (5) as a function of $\theta$.

Using the results of the numerical model, FIG. 5($a$) plots $\gamma$ vs. $\theta$ for up to $\theta=60°$. Eq. (5) continues to hold with very high accuracy well past the regime where small angle assumptions are valid. FIG. 5($b$) shows that use of Eq. (5) results in only −0.35% error at $\theta=30°$, and −1.63% error at $\theta=60°$. Since sweeps of less than 60° are likely to be used in practice, Eq. (5) is a very good approximation even for large angles and thus is used to estimate the orientation of $\overline{ds}_i$.

The only remaining task is to formulate a method of estimating $|ds_i|$—the magnitude of $\overline{ds}_i$—which (neglecting friction) depends entirely on the curvature of the object surface at the current contact point. If the curvature is infinite (i.e., the contact point is the corner of an object or a point-object), then $|ds_i|=0$; otherwise, $|ds_i|>0$. To estimate $|ds_i|$ when it is non-zero, we express it as a function of the new moment at the whisker base $M_{i+1}$, as well as two numerically computed quantities.

Defining $M_{\delta,i}$ as the moment after deflection $\delta_i$ and $dM_i/ds$ as the rate of change of moment with respect to $|ds_i|$ (following along the beam towards the base) we can write $$M_{i+1} = M_{\delta,i} + \frac{dM_i}{ds} \cdot |ds_i|. \qquad (6)$$

And, solving for $|ds_i|$, we have $$|ds_i| = (M_{i+1} - M_{\delta,i}) \cdot \frac{ds}{dM_i}. \qquad (7)$$

Consolidating Eqs. (5) and (7), $$\overline{ds}_i = (M_{i+1} - M_{\delta,i}) \cdot \frac{ds}{dM_i} \cdot \begin{bmatrix} -\cos\left(\frac{3}{2}\theta_i\right) \\ \sin\left(\frac{3}{2}\theta_i\right) \end{bmatrix}. \qquad (8)$$

Finally, combining Eqs. (3), (4) and (8), we have $$\begin{bmatrix} d_{x,i+1} \\ d_{y,i+1} \end{bmatrix} = \begin{bmatrix} d_{x,i} \\ d_{y,i} \end{bmatrix} - r_i \cdot d\alpha \cdot \begin{bmatrix} \sin\theta_i \\ \cos\theta_i \end{bmatrix} + \qquad (9)$$

$$(M_{i+1} - M_{\delta,i}) \cdot \frac{ds}{dM_i} \cdot \begin{bmatrix} -\cos\left(\frac{3}{2}\theta_i\right) \\ \sin\left(\frac{3}{2}\theta_i\right) \end{bmatrix}.$$

Figure 6A:
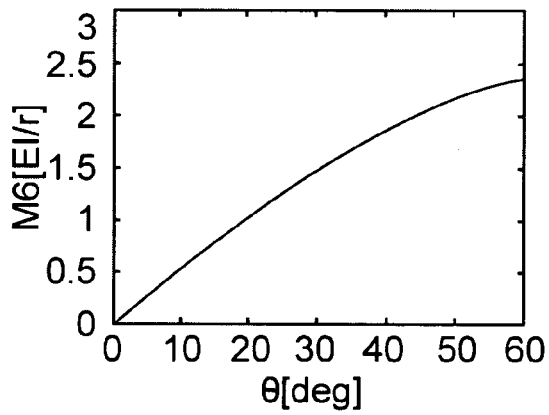
FIG. 6a shows results of the numerical elastica model (see Appendix) providing the relationship between $\theta$ and $M_\delta$ and FIG. 6b shows the relationship between $\theta$ and $dM_{\delta,x}/ds$, required by the sweeping algorithm. The solid lines are the original data, and the dotted lines are the results of cubic polynomial fits.
Figure 6B:
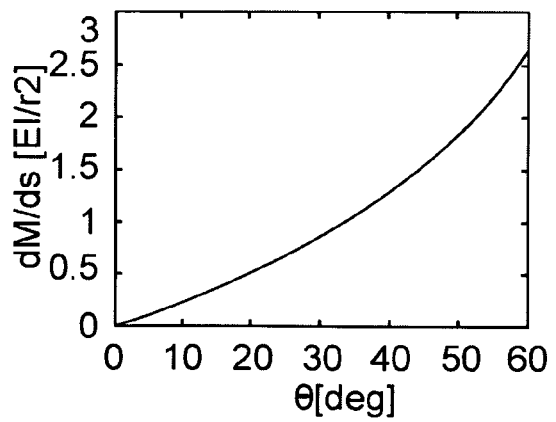

Because $M_{i+1}$ is measured by the torque sensor, there are only two remaining unknown variables needed to find the new contact point: $M_{\delta,i}$ and $dM_i/ds$. Again, the numerical model provided in Appendix, part 2 is used, and the results are shown in FIG. 6. The curves are normalized using r as a scaling parameter, so that $M_\delta$ has units of [EI/r], and dM/ds has units of [EI/$r^2$]. Also shown are the results of cubic polynomial fits to both curves (dashed lines), which serve as convenient methods of implementing these relations. The polynomials contain no degree zero term since the underlying function passes through the origin, and were fit by minimizing the sum of squared errors. The resulting equations are as follows:

$$M_{\delta,i} = \frac{EI}{r_i} \cdot (-0.6673 \cdot \theta_i^3 - 0.0354 \cdot \theta_i^2 + 3.0069 \cdot \theta_i) \qquad (10)$$

$$\frac{dM_i}{ds} = \frac{EI}{r_i^2} \cdot (1.5289 \cdot \theta_i^3 - 0.8402 \cdot \theta_i^2 + 1.6799 \cdot \theta_i) \qquad (11)$$

where $\theta_i$ is in units of radians and $r_i = \sqrt{d_{x,i}^2 + d_{y,i}^2}$. Note that Eqs. (10) and (11) have the relevant normalization factors included, but also that bending stiffness EI may not be obtainable with high precision. In practice, it is not necessary to know EI, as the torque sensor is calibrated to units of curvature at the whisker base (e.g., from voltage), in which case EI effectively becomes unity. This is addressed further below.

At each step of the algorithm, the current contact point is computed with respect to the current local (x-y) reference frame. Therefore, conversion to coordinates in a global (X-Y) reference frame is necessary. This is straightforward using a rotation matrix:

$$\begin{bmatrix} d_{X,i} \\ d_{Y,i} \end{bmatrix} = \begin{bmatrix} \cos\psi_i & \sin\psi_i \\ -\sin\psi_i & \cos\psi_i \end{bmatrix} \begin{bmatrix} d_{x,i} \\ d_{y,i} \end{bmatrix} \qquad (12)$$

where $\psi_i = \psi_{contact} + \alpha_i$, and is the angle tangent to the whisker base in the global coordinate system.

Before testing the sweeping algorithm in hardware, it was numerically validated by simulating the rotation of a cantilever beam against circles of varying diameter and at varying distances. The beam shapes and moments at the base were computed using the numerical model in Appendix, part 2. Using $\alpha_0=3°$ and $d\alpha=1°$, the extracted contact points aligned nearly perfectly along the circles' perimeters. As expected, the smaller $\alpha_0$ and $d\alpha$ were scaled, the closer the alignment between contact points and surface.

For completeness, we note that in certain applications, the whisker may need to be linearly translated instead of rotated against the object. Modification of the algorithm for translation is straightforward, and is included in Appendix, part 3.

Experimental Results

Figure 7:
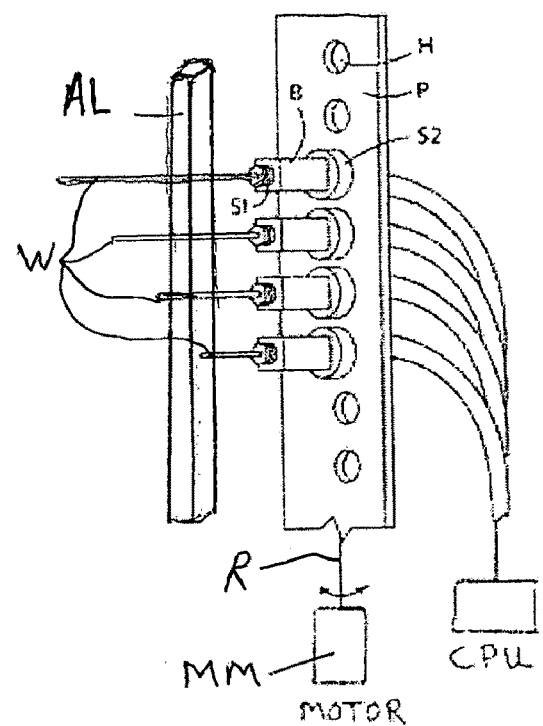
FIG. 7 illustrates the experimental test set-up. The whisker was rotated against aluminum bars with circular-, hexagonal- and square-shaped cross-sections (hexagonal shown here). The vertical line R shows the axis of rotation. A protractor (not shown) underneath the object was used to manually set its orientation.
Figure 7A:
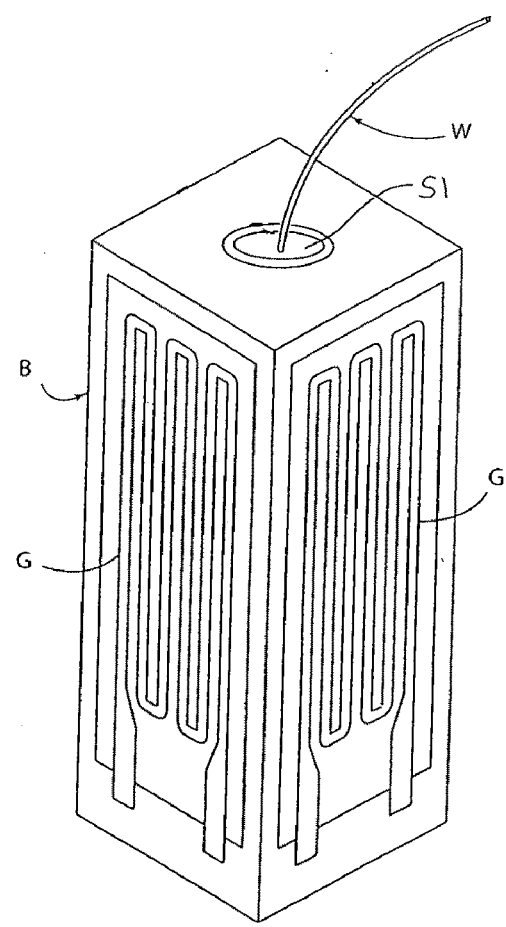
FIG. 7a is an enlarged view of the follicle.

The algorithm was tested using aluminum bars AL with circular-, hexagonal- and square-shaped cross-sections. The robotic whisker used in these experiments has been used in previous research [3, 9]. Typical of robotic whisker designs, the whisker W consists of a straight, flexible wire to act as the vibrissa, attached to a torque sensor at the base (the "follicle") B. The vibrissa is 0.5 mm in diameter and 5 cm in length, and is composed of superelastic Nitinol (E≈80,000 MPa) to ensure retention of its original straight shape. The follicle B is a small aluminum block (4×4×8 mm) with a strain gage G attached to each of its four exposed faces. Although the follicle is capable of sensing both orthogonal components of moment, no lateral slip occurred in these experiments and hence only two of the four strain gages (on opposite sides of the block) were utilized. The follicle was attached to an aluminum bar P with a set screw S1, and the bar P was attached to an AC servomotor MM for actuation. The base of the vibrissa (and tip of the follicle) resides at the resulting axis of rotation, ensuring adherence to the sensing model. The centers of the test objects were placed 4 cm in front of the whisker base, as shown in FIG. 7.

Before experimental data were taken, calibration trials were performed to convert the strain gage voltage output to curvature at the whisker base. Curvature and moment are linearly related by the bending stiffness EI (Eq. (A7)). In practice, it is more convenient to calibrate the follicle to curvature instead of moment since knowledge of E and I are not required. All experimental and calibration data were low-pass filtered at 800 Hz, sampled at 2000 Hz, and passed through a zero-phase digital filter with a cutoff frequency of 10 Hz.

The follicle was calibrated by rotating the whisker at a speed of 10 deg/s through an amplitude of 60° against a slender peg at a radial distance of 4 cm (starting out barely touching). Using Eq. (10) with EI set to 1 allows the true curvature to be inferred for all values of $\theta$. Plotting curvature vs. voltage generates a calibration curve, which was stored as a cubic spline, to be used to convert the experimental data from voltage to curvature. The curve starts out linear, but levels off slightly as the curvature becomes large.

Each experimental trial occurred as follows. The whisker started at rest, placed at a radial distance of 4 cm and oriented −30° relative to the object's center. At a speed of 10 deg/s, the whisker was rotated against the object with an amplitude of 60°, immediately retracting back to −30°. The whisker was held stationary while the object was rotated about its center by 30°. This procedure was repeated an additional 11 times, resulting in the whisker contacting all or almost all of the objects' perimeters. Although in actuality we are keeping the location of the whisker base fixed in space and rotating the object between whisks, this is functionally equivalent to having the whisker base move around the fixed object between whisks, in a circular manner.

Figure 8A:
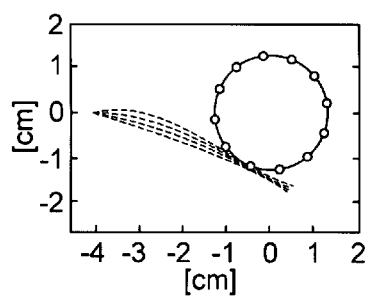
FIGS. 8a-8c and 8d-8f illustrate results of implementing the sweeping algorithm on smooth (8a) circular, (8b) hexagonal, and (8c) square objects, and rough (8d) circular, (8e) hexagonal, and (8f) square objects. A total of 12 whisks were performed at evenly-spaced (30°) intervals around the objects. Initial contact points are indicated by small white circles, and subsequent points computed by the sweeping algorithm are smaller black dots. Thin lines indicate the actual underlying shape profile. For the first whisk, the orientation of the whisker upon object contact is indicated by a dotted line, and subsequent whisker shapes are indicated in 10° increments by solid lines. These shapes were generated using the numerical model in the Appendix, part 2. This was done for illustrative proposes, and is not required by the sweeping algorithm.
Figure 8B:
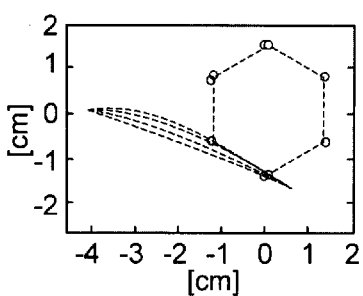
Figure 8C:
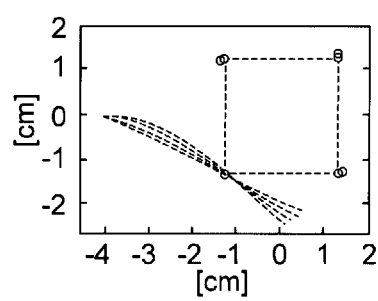

After filtering the data, Eqs. (1) and (2) were used to compute the initial contact point using $\alpha_0 = 3°$. Subsequent points were generated by iteratively applying Eqs. (9)-(11), with $d\alpha = 1°$ using the CPU. This procedure gives the contact points within the local whisker reference frame (see FIG. 3); hence conversion to a global frame using Eq. (12) was necessary before plotting. The results, shown in the top row (FIGS. 8a, 8b, 8c), demonstrate that the sweeping algorithm accurately estimates successive contact points as the whisker slips along the perimeters of all three shapes. For purposes of illustration and not limitation, data analysis was performed using MATLABv7.0 software on CPU, which can be a conventional personal or other computer programmed with the operating algorithm. The CPU can output contact points information to a visual display for viewing, to a printer for printing the output for viewing, and/or to computer system memory for storage and use of the information.

Figure 8D:
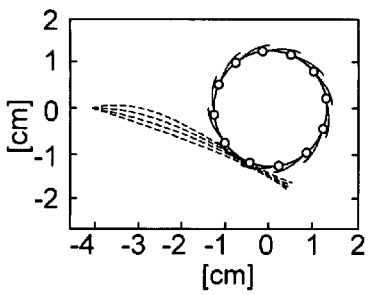
Figure 8E:
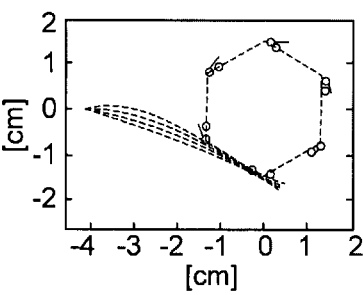
Figure 8F:
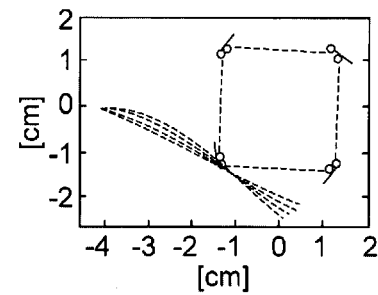

The sweeping algorithm assumes no friction between the whisker and the object, which influences Eqs. (5), (10) and (11). These equations were derived under the assumption that the direction of the contact force is normal to the whisker at the contact point, which is increasingly inaccurate for a rough object as $\theta$ becomes large. To test the effect of friction, the experiments were repeated with 120 grit (moderately rough) adhesive-backed sandpaper stuck to the objects. The bottom row (FIGS. 8d, 8e, 8f) shows that although some precision is lost, the general object profile shapes are again faithfully reproduced. Increasing the friction further would likely result in increasingly inaccurate results, but such rough objects are unlikely to be encountered in most applications.

Another important parameter is the whisking speed. The experiments described here used a slow speed (10 deg/s) to minimize inertial effects, but much faster speeds can be implemented in practice. The above experiments were repeated using a whisking speed of 90 deg/s with similar results for both smooth and rough surfaces (data not shown). Qualitatively, the only significant difference involved a greater dispersion of contact points at the edges of the smooth objects. Increasing the whisking speed significantly beyond about 90 deg/s should be done with caution, as inertial effects will increasingly generate torque signals at the base. Possible methods to mitigate inertial effects might include insuring smoothness of the actuation trajectory, e.g. by integrating some form of machine learning component with the algorithm.

To give a quantitative measure of contact point extraction accuracy, ideally we would have measured the distance from each estimated contact point to its actual contact point, but doing so would have required use of a high speed video camera and cumbersome image analysis. Instead, the error associated with each contact point was defined as the minimum distance from the point to the object surface. The error was also computed in a normalized form by dividing the absolute error by the initial contact distance $r_0$ for each whisk. Table 1 presents these results for each of the four experimental conditions, each averaged over all three shapes. Consistent with FIG. 8, the rough surface condition decreases the overall accuracy, but average error remains under 1 mm (2.39%). Table 1 also confirms that whisking at 90 deg/s does not significantly affect the results.

TABLE 1

Quantification of estimated contact point accuracy.

| Experimental conditions | Average error [mm] | Average normalized error [%] |
|---|---|---|
| Smooth surface, $\dot{\alpha}$ = 10 deg/s | 0.32 | 0.85 |
| Rough surface, $\dot{\alpha}$ = 10 deg/s | 0.88 | 2.39 |
| Smooth surface, $\dot{\alpha}$ = 90 deg/s | 0.35 | 0.92 |
| Rough surface, $\dot{\alpha}$ = 90 deg/s | 0.52 | 1.41 |

The sweeping algorithm presented has been shown to be highly accurate for three distinct 2D shapes. In all three cases, the entire profile shape was reliably extracted with only 12 whisks, clearly providing significant additional shape information beyond the initial contact point alone. In addition, visual inspection showed that the sequence of extracted points closely matched the actual movement of the whisker along the object. In several cases, the whisker remained in discrete contact with a corner during an entire whisk (zero longitudinal slip). As expected, the estimated contact points would remain in the same region, usually within a range of 2 mm from the first contact point for the smooth objects (but up to about 5 mm for rough objects). In other cases, significant slip along the object occurred, whereupon the estimated contact point would accurately align with the perimeter of the object.

The sweeping algorithm described here requires reasonable choices to be made for $M_{thresh}$, $\alpha_0$ and $d\alpha$. $M_{thresh}$ should be as close to zero as possible while ensuring it is not exceeded as a result of dynamic effects and sensor noise. A good rule-of-thumb is to make $\alpha_0$ as small as possible, while still ensuring a strong enough torque signal to allow accurate distance extraction when contact occurs near the whisker tip. The choice of $d\alpha$ is predicated on a tradeoff between accuracy and computational efficiency, as well as the desired number of extracted points. Efficiency will generally be a negligible issue, as each iteration involves only evaluating the algebraic Eqs. (9)-(12). However, decreasing $d\alpha$ below 1° typically has an insignificant effect on the accuracy of the algorithm. (In fact, reasonable accuracy can be obtained for $d\alpha$ as large as ~5°) Therefore, in general practice, choice of $d\alpha$ is determined by the desired number of extracted contact points.

The assumptions inherent in the sweeping algorithm deserve careful consideration:

Friction—Although the assumption of zero friction is not technically valid if the surface is rough, we have shown that the sweeping algorithm produces good results even in the relatively extreme case of 120 grit sandpaper. The model has thus been empirically shown to work in the presence of friction, albeit with somewhat reduced accuracy.

Tip contact—For distance extraction with Eq. (1), tip contact is easily handled by setting an upper threshold on $r_0$ equal to the length of the whisker [9]. However, the assumption that the contact force acts normal to the whisker at the contact point can be inaccurate if the whisker touches the object at the tip, and also the tip can slide along the object, invalidating Eq. (4). We implemented a modified version of the sweeping algorithm for the case of tip contact, setting $\overline{ds}_i$ to zero (since tip contact generally persists during a whisk), and using a numerical technique to estimate $\overline{\delta}_i$ based on the moment $M_{i+1}$. Unsatisfactory results were obtained. Therefore, in practice, the sweeping algorithm should be halted for whisks in which, during the initial "tap" of the whisker on the object, $r_0$ is found to equal to the whisker length, and the location of the whisker base moved closer to ensure contact along the whisker length.

Lateral slip—The sweeping algorithm explicitly assumes that no lateral slip occurs. Note that this does not necessarily require that the surface be oriented exactly perpendicular to the plane of rotation, as friction can prevent lateral slip in some cases [3]. When lateral slip does occur, it can easily be sensed through measurement of the orthogonal (y) component of moment as described in the aforesaid copending application, in which case either the sweeping algorithm could be halted until the next whisk, or the plane of rotation could be actively adjusted to prevent lateral slip from occurring [6, 7].

Figure 9A:
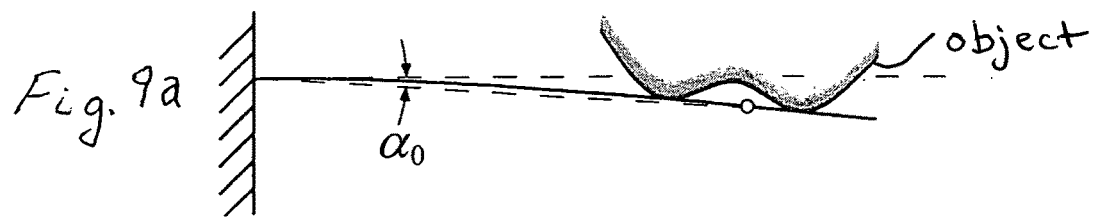
FIGS. 9a and 9b illustrate possible problems associated with concave object features.
Figure 9B:
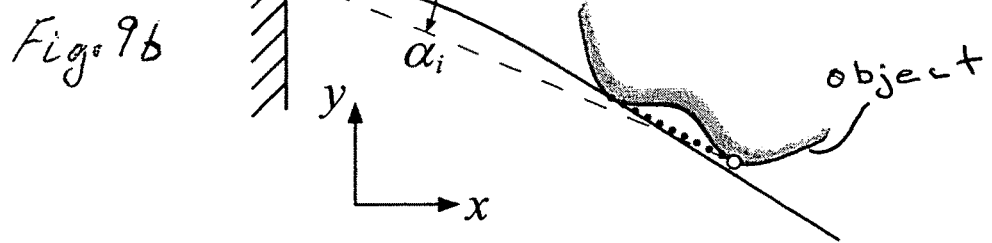

Concave object features—Two situations must be addressed:

1. If the whisker contacts the object at two discrete points during its initial rotation by $\alpha_0$, then distance extraction using Eq. (1) can be affected, as shown in FIG. 9 (top). However, this situation is statistically unlikely to occur because it would require two points along the object to precisely align with the whisker upon contact. Regardless, it is relevant to note that our empirical results demonstrated that the sweeping algorithm is able to quickly "damp out" error associated with the use of Eq. (1). To show this, we processed the experimental data, except that $r_0$ was set to random values between zero and the whisker length, instead of using Eq. (1). After an additional rotation of about 5-10° (depending on the error in $r_0$), subsequent extracted points aligned accurately along the objects. This inherent robustness can be explained by the iterative nature of the algorithm. When $r_0$ is inaccurate, the $|ds_i|$ component of Eq. (9) (also see Eq. (6)) will cause the estimated contact point location to move increasingly close to actual contact point each iteration.

2. Concave regions of an object might be omitted ("swept over") as the whisker rotates through a large angle, in which case the sweeping algorithm would effectively place contact points along the line connecting those parts of the object that were actually touched, as shown in FIG. 9 (bottom). In order to subsequently discover such a concave feature, the base of the whisker would have to be translated to a new location such that the whisker tip crosses the line of false contact points, thus indicating their inaccuracy and allowing them to be discarded. Note that for a straight whisker, it is geometrically possible to sample concave object features only through contact at the whisker tip.

Non-discrete object contact—During a whisker sweep, the whisker may come in contact with the object along a continuous segment of its length, inconsistent with the discrete contact model. This situation clearly occurred in the experiments for both the hexagon and square objects, yet it did not adversely affect the results. This form of robustness is due to the mechanical nature of segmental object contact, which produces a moment at the base equivalent to discrete object contact at some point within the same segment. Thus, in such cases, the algorithm will effectively determine the contact point to be somewhere along the contact segment.

Object compliance—If the object is not rigid relative to the stiffness of the robotic whisker(s), computation of $r_0$ using Eq. (1) and the $\overline{\delta}_i$ components using Eq. (4) during a sweep may be inaccurate. A method for finding $r_0$ for a compliant object is offered by [6] which involves whisking at two different distances. Although further research would be required to accommodate the sweeping algorithm, the most straightforward solution is to use thin, flexible robotic whiskers so that the compliance of most objects is negligible compared to that of the whisker. The benefit of decreasing whisker stiffness must be balanced against the drawback of decreasing the torques that will be sensed. As a rule of thumb, the stiffness should be large enough to ensure a sufficient reaction torque after rotating by $\alpha_0$ to allow accurate use Eq. (1), in the case that the whisker touches the object near its tip. Note that $I=\frac{1}{4}\pi r^4$, so that halving the whisker diameter will decrease I (i.e., stiffness) by a factor of 16.

Moving objects—Because the algorithm assumes that the object is static, any change in sensed moment due to movement of the object will be wrongly interpreted. The most straightforward solution is to whisk at a speed which nullifies object movement. Because real rat whiskers have very little mass, they move very rapidly (up to 1500°/s [13]).

It is interesting to compare the sweeping algorithm developed here with that implemented by Scholz and Rahn [12]. Scholz and Rahn use a hub load cell and a nonlinear elastica model to numerically integrate the shape of the whisker at each time step. One advantage of this approach is that it does not lose accuracy when contact occurs at the tip. Another possible advantage is that active movement of the whisker is not explicitly required; in other words, the base angle, force and torque history over a given sweep are not needed to estimate a given contact point. However, there are two drawbacks to their method. The primary drawback is that it requires a sensor that can measure two components of force in addition to moment. These load-cell sensors are typically prohibitively bulky and expensive for use in an array of whiskers. In contrast, the parts to construct the torque sensor used in this study only cost about $20 (four strain gages, only two of which were used) [3]. The second drawback is that the technique involved numerically computing the shape of the whisker each time step, which can require significant computational resources to run in real time for multiple whiskers. In contrast, the algorithm presented here computes contact points by iteratively inferring position changes based on small successive changes in whisker angle α and sensed moment M. This makes it extremely efficient, involving only the evaluation of the algebraic Eqs. (9)-(12) on each iteration.

Although our method has been derived for cylindrically-shaped whiskers, it is not limited to this case. The sweeping algorithm could work for a whisker with geometrical characteristics, for example, in the case that the whisker is curved and/or tapered. Equation (1) would simply be replaced with the distance extraction equation for a curved, conical whisker [9]. However, γ, $M_\delta$ and dM/ds would now also depend on the arc length contact distance $s_F$ in addition to θ. As a result, Eqns. (5), (10) and (11) would become functions of two variables, θ and $s_F$. These functions could be generated using the numerical method in Appendix, part 2 and stored in a look-up table (or any convenient function approximator, e.g. two-variable polynomial, radial basis function network, or multilayer perceptron). Equations (8) and (9) would also change in accordance with (5).

The invention provides an effective, efficient and easy-to-implement method for obtaining object profile shape information over a single whisk with a robotic whisker. Because force does not need to be measured, physical implementation of the algorithm requires only small, inexpensive torque sensors (e.g., but not limited to strain gages). This makes it easy to implement on a highly parallel array of robotic whiskers. The algorithm was shown to be robust to sensor noise, object friction and segmental contact.

Method Embodiment to Use Whiskers to Obtain Local Estimates of Object Curvature and the Force being Exerted on the Whiskers.

The present invention also envisions using whisker sensors to obtain local estimates of object curvature and the force being exerted on the whiskers. Two methods are described below to predict, based on current estimates of the local contour (curvature) of an object the contour (curvature) that will be obtained at the next sample. Comparison of predicted curvature with actual curvature yields information that facilitates known rat behaviors, and also provides a mechanism for edge detection. A method is provided for axial force measurements to decrease prediction error in equation 2 below.

Radial Distance Estimation

The embodiments described above show that strain gauges can be used to accurately estimate radial distance during a rotational 'sweep' of a whisker against a stationary object. This present embodiment modifies the algorithm to find radial distance as an object moves by a stationary array of whiskers.

Figure 12:
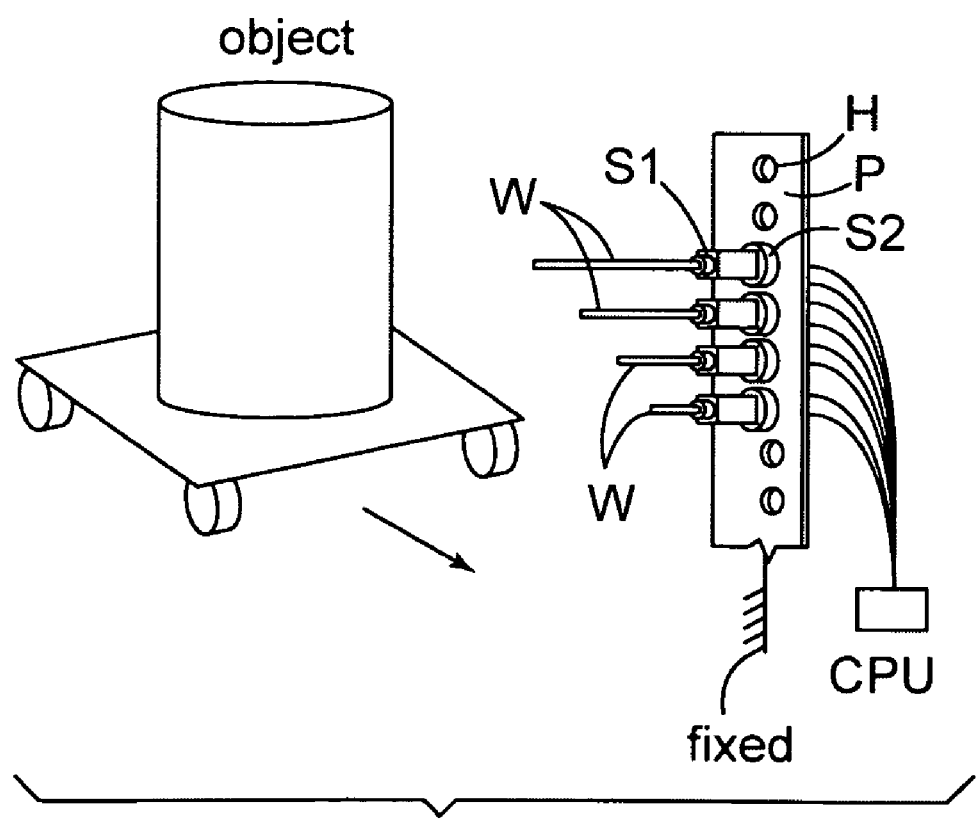
FIG. 12 shows an object linearly translating with respect to the whisker array, demonstrating that the algorithm works whether the array is moving and the object is static, or the object is static and the array is moving—the relative motion is the same.

Radial distance is defined as the Euclidean distance between the base of a whisker and the point of object contact. The previously described method embodiments achieved object contact through whisker actuation and employed the algorithm described above. This embodiment provides another method embodiment for radial distance estimation and involves a similar technique but has been developed for use when object contact is achieved through linear actuation with one or more stationary whiskers W, FIG. 12 shown for purposes of illustration and not limitation. To illustrate the difference between the algorithms, a brief overview is presented.

Radial Distance Algorithm

Once a whisker has been calibrated, the voltage recorded from that whisker is converted to moment at the base of the whisker. The radial distance $r_0$ to the initial contact point is calculated using $$r_0 = k \frac{\theta_0}{M_0} \tag{1}$$

where k=3EI, E is the elastic modulus of the whisker, I is the area moment of inertia, $\theta_0$ is a small pushing angle beyond initial contact (typically about 3°), and $M_0$ is the moment at the whisker base.

The distance estimation algorithms are applied iteratively from this first point after either a small incremental rotation (dθ) or a small incremental linear movement (dL). The calculation of radial distance at the next time step ($r_{n+1}$) requires several steps, but the main difference between algorithms is in finding the magnitude of the vector $\bar{\delta}_n$, perpendicular to the longitudinal axis of the whisker at the contact point. Defining the x-axis parallel to the whisker at t=$t_0$, the above method embodiments define $\bar{\delta}_n$ as follows:

$$\bar{\delta}_n = -r_n \cdot d\theta \cdot \begin{bmatrix} \sin\theta_n \\ \cos\theta_n \end{bmatrix}. \tag{2}$$

where $r_n$ is the radial distance at the current time step, dθ is the incremental rotation, and $\theta_n$ is the angle between the whisker base at time $t_0$ and the base at time $t_n$. Conversely, $\bar{\delta}_n$ is defined in the algorithm for linear actuation by:

$$\bar{\delta}_n = \begin{bmatrix} 0 \\ dL \end{bmatrix} \tag{3}$$

where dL is the incremental linear movement between time steps. For these definitions, it is important to note that the whiskers are fixed perpendicular to the direction of linear movement during linear actuation such that linear motion only occurs parallel to the y axis. A full explanation of the distance extraction algorithm is provided above.

Finding Curvature

Radial distance estimates can be used to calculate an estimate of object curvature κ by using the known velocity of the whisker or the object. With a known velocity, radial distance estimates at each time step can be translated into a point in an x-y coordinate system. For the purposes of this study, κ is approximated as $$\kappa \approx \frac{d^2 y}{dx^2} \tag{4}$$

where x and y represent the estimated x and y coordinates of each contact point. Because data are discrete, the derivative is a discrete-time approximation.

Prediction

Estimated curvature and radial distance were used to predict future contact points through the use of two different methods. The first method used one whisker at a time and required memory of a certain number of past contact points. The second method used multiple whiskers, FIG. 12, to take a larger scale spatial gradient using only the current time point. For each of these methods, there were two prediction algorithms used.

To calculate the spatial gradient of an object's surface from data gathered by a single whisker, memory must be used. Because data are discrete, the amount of memory required is quantized into a specific number of previous samples. In this study, the number of prior points used ranged between 5 and 20. The large scale spatial gradient uses one sample from each whisker, and does not require memory. To produce the several samples necessary to compute a gradient, 3 to 5 whiskers are used.

Prediction using Radial Distance

From the above-described algorithm, it can be seen that each radial distance can be translated into a single point in an x-y coordinate system. The discrete-time approximation of the derivative at each such point provides an estimate of the surface gradient. This estimate can be used to predict future contact points.

The first step in this process is to change the time derivative into a space derivative. This can easily be accomplished because the x-coordinate of this system is dependent on actuation, such that (for linear actuation)

$$x_{n+1} = x_n + \left(\frac{v}{f_s}\right) \tag{5}$$

where v is the object velocity in cm and $f_x$ is the sampling rate in Hz. The velocity and sampling rate are timing constants that give each $x_n$ a meaning in the time domain. Thus, the equation $$\frac{dy_n}{dx} = \frac{\Delta y}{\Delta x} = \frac{y_n - y_{n-1}}{x_n - x_{n-1}} \tag{6}$$

where $(x_n, y_n)$ is the current point, and $(x_{n-1}, y_{n-1})$ is the previous point can be used to approximate the time derivative.

Once the derivative has been calculated for each $y_n$, it is straightforward to predict the next contact point. For N contact points, there will be (n−1) derivative measurements as seen in equation (6). The derivative between $y_{n+1}$ and $y_n$ is found by averaging the discrete derivatives of the prior points:

$$\frac{dy_{n+1}}{dx} = \frac{1}{N}\sum_n \frac{dy_n}{dx} \tag{7}$$

This derivative is then used to calculate $y_{n+1}$.

$$y_{n+1} = y_n + \frac{dy_{n+1}}{dx}(x_n - x_{n-1}) \tag{8}$$

$$x_{n+1} = x_n + (x_n - x_{n-1}) \tag{9}$$

It is clear from equation (8) that using only differences in radial distance results in a linear approximation of the surface gradient. The constant change in x is then utilized to find the estimated future contact point.

Prediction Using Curvature

The prediction method using radial distances that is outlined above finds the next contact point through linear approximation. When curvature is used instead, the next contact point can be found through a quadratic approximation.

To begin, the discrete derivative with respect to x is found as in the previous section. In equation (4), curvature is approximated as the second derivative of y with respect to x. The discretized version of this equation is $$\kappa_n = \frac{dy_n}{dx} - \frac{dy_{n-1}}{dx} \tag{10}$$

where $\kappa_n$ is the curvature at $y_n$, $$\frac{dy_n}{dx}$$

is the derivative between $y_n$ and $y_{n-1}$, and $$\frac{dy_{n-1}}{dx}$$

is the derivative between $y_{n-1}$ and $y_{n-2}$. At this point, the derivative between $y_{n+1}$ and $y_n$ is found:

$$\frac{dy_{n+1}}{dx} = \frac{dy_n}{dx} + \frac{1}{N}\sum_n \kappa_n \tag{11}$$

From this equation, and $y_{n+1}$ and $x_{n+1}$ can be found using equations (8) and (9).

Error

To test the accuracy of each prediction method, error was defined as:

$$E_{dist} = \sqrt{(x_p - x_{act})^2 + (y_p - y_{act})^2} \tag{12}$$

where $E_{dist}$ is the distance error, $(x_p, y_p)$ is the predicted coordinate, and $(x_{act}, y_{act})$ is the actual coordinate. All values are defined for each n. It is easy to see that distance error is just the Euclidean distance between the predicted coordinate and the actual coordinate. Prediction error was calculated by dividing distance error by the estimated contact distance at that time point:

$$E_{pred} = \frac{E_{dist}}{y_{act}} \quad (13)$$

Results

Figure 13:
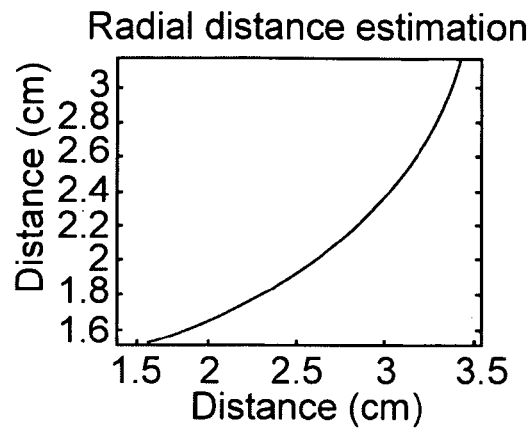
FIG. 13 is a plot showing radial distance estimation of a 2.4 cm diameter cylinder. The estimated data points are plotted versus a solid line indicating the actual profile of the cylinder.

The method of this embodiment using the modified algorithm is demonstrated in FIG. 13 to have the same degree of accuracy as the original (unmodified) algorithm. To test this method embodiment using the modified algorithm, a 2.5 cm diameter was fixed to the moving stage of the linear actuator represented by the arrow, FIG. 12, and passed by a single whisker that had been fixed perpendicular to the direction of motion. FIG. 13 shows the radial distance estimates for a linear velocity of 2 cm/s. The maximum difference between the actual object position and the estimated contact point at any given time was 0.1 mm.

Prediction of Future Contact Points with Constant Curvature

Figure 14A:
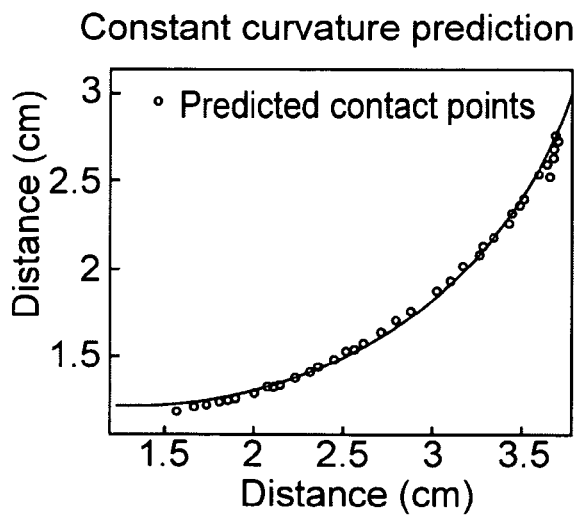
FIG. 14a is a plot of predicted contact points using the curvature prediction method.
Figure 14B:
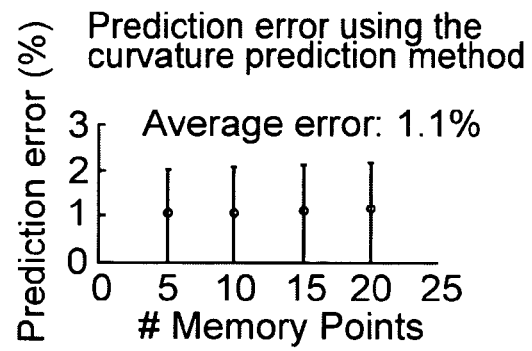
FIG. 14b shows the average prediction error for a trial using 5, 10, 15, or 20 memory points.
Figure 14C:
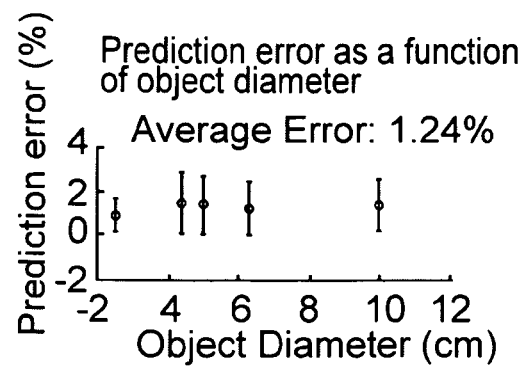
FIG. 14c shows the prediction error for different object diameters.

The first testing was conducted using the single whisker prediction method on a cylinder with a 2.5 cm diameter. Cylinders were chosen because they have constant curvature, and are therefore the simplest test objects. Radial distance calculations from each time step were used to predict future contact points. FIGS. 14a, 14b, 14c illustrate the accuracy of the prediction methods.

In FIGS. 14a-14c the curvature prediction method (Eqns. 8-11) was used with a single whisker. FIG. 14a shows the predicted contact points plotted over a curve representing the actual surface of the cylinder. In FIG. 14b, the prior 5, 10, 15 and 20 points were used to calculate the predicted next contact point. Prediction error was then calculated according to Eqn. 13. There is no significant difference between the trials. The average error across the trials was 1.1%. In FIG. 14c, cylinders with diameters of 2.5 cm, 4.4 cm, 5.0 cm, 6.3 cm, and 10 cm were passed by the array at a velocity of 2 cm/s. Radial distance calculations from each time step were used to predict future contact points. FIG. 14C shows the effect of decreasing object curvature on prediction error for a single whisker. There is no significant effect of object diameter on prediction error. The average error across the trials for the curvature prediction method was 1.24%

Figure 15:
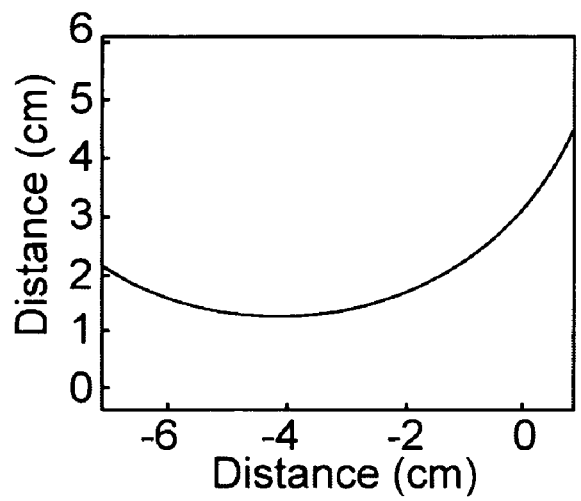
FIG. 15 illustrates the predicted future contact points line up very well with the actual surface of the cylinder (black line). Average error is 1.13%. Each different region of contact points corresponds to contact points from separate whiskers.

It is likely a rat uses multiple whiskers to estimate the surface gradient at a single time point rather than using a single whisker with a memory of past time. For this technique to be viable, the chosen whiskers must all be touching the object at once. The spacing between adjacent whiskers that was chosen to illustrate the multiple whisker prediction algorithm is 1 cm. To ensure there were times when all five whiskers touched the test object concurrently, only the 10 cm diameter cylinder was used for these constant curvature trials. FIG. 15 shows the predicted future contact points for the whisker array as the array moves forward. Each predicted point is 1 cm further along the object than the lead whisker was at the time of the point's prediction. Since the five points of contact come from five different whiskers, the predicted curvature gradient is implemented over a much wider spatial scale. Small errors in distance estimation result in larger deviations in the predicted future contact.

Prediction of Future Contact Points with Variable Curvature

The results above show that the curvature prediction method embodiment is capable of accurately predicting future contact points for an object with constant curvature. In the world, however, such objects are rarely found. This section explores the effects of abrupt changes in curvature on the prediction method defined by Eqns 8-11.

Variable Curvature Prediction Using Linear Actuation, One Whisker Method

Figure 16A:
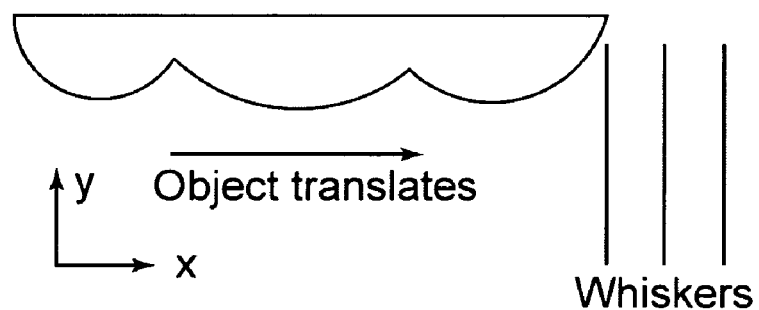
FIG. 16a illustrates the profile a test object with differing curvatures. The coordinate system shown is consistent with the orientation of the whisker array.

To show the effect of abrupt changes in object curvature on prediction, a simple case was examined. FIG. 16a shows the test object. The object has three distinct constant curvatures with no smoothing transition from one to the next. The radii of curvature for the sections were 2.5 cm, 3.15 cm, and 2.2 cm. The object was moved past one whisker of the whisker array using linear actuation at a velocity of 2 cm/s. The curvature prediction method was used for each whisker with predicted contact points shown in FIG. 16b.

Figure 16B:
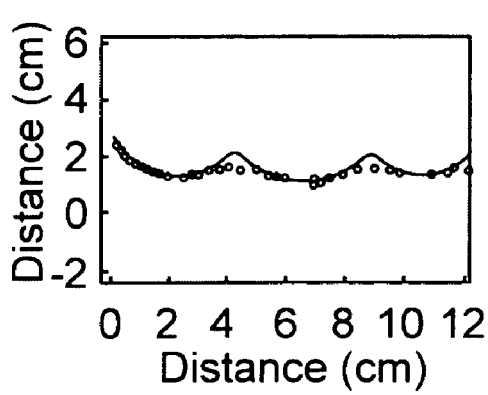
FIG. 16b shows predicted contact points mapped onto the test object. At the transition between curvatures, the prediction error jumps.
Figure 16C:
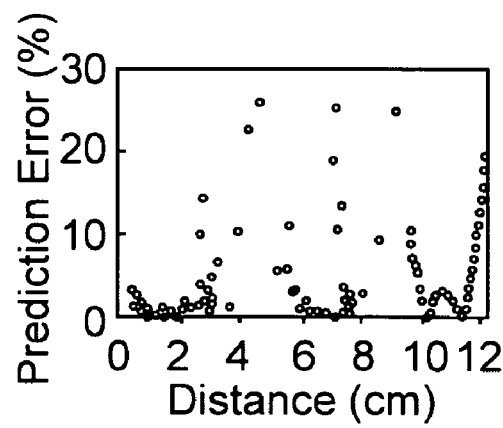
FIG. 16c illustrates prediction error (%) for each of the predicted data points.

It can be seen from FIG. 16c that the prediction error remains small during the first section of constant curvature. At the transition to the second curvature, the prediction error increases, with the maximum value more than quadrupling the average error during the first section. Once the whisker has been able to sense the second curvature for a short time, prediction error returns to normal. The second transition is similar to the first. Close examination of FIG. 16b shows fewer predicted points during the times when the algorithm is least accurate. The reason for this is because the whisker slips along the back curve of each section, covering the distance more quickly than during slip-free data collection. The increase in error this longitudinal slip causes in the estimation of distance can be significant, so it is difficult to determine how much of the prediction error is due solely to the change in curvature. Axial force sensing would likely solve this problem.

Prediction for Gradual Curvature Changes

Figure 17A:
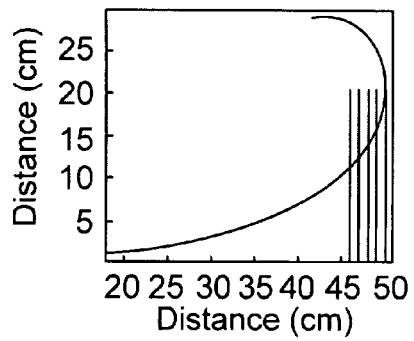
FIGS. 17a, 17b, 17c illustrate prediction on different curvature scales with 1 cm whisker spacing. The spiral halves in length from FIGS. 17a to 17b and again from FIGS. 17b to 17c. Dots are predicted contact points. As spiral size decreases, prediction error increases.
Figure 17B:
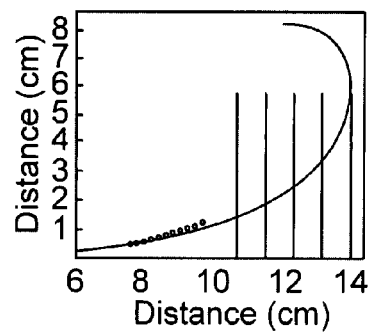
Figure 17C:
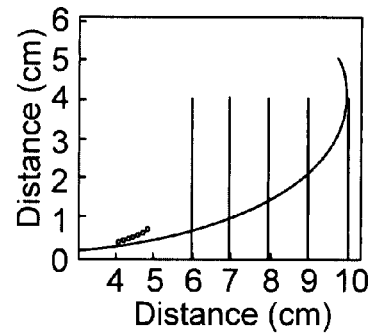

To show the effect of gradual changes in object curvature, three cases were examined in simulation. A hyperbolic spiral was used as the test object because it can be translated past the whisker array in such a way as to have the curvature constantly decreasing. In these simulations, the multiple-whisker prediction algorithm was used, with whisker spacing set to 1 cm. The size of the spiral test object was decreased for each case, illustrating the affect of relative whisker spacing on prediction error. FIGS. 17a, 17b, 17c show the test object on three different length scales, as whisker spacing stays constant. It can be seen from the figure that prediction error increases as the test object decreases in size. This result is expected, because the resolution (whisker spacing) of the sensing mechanism is decreasing relative to the change in curvature that is occurring. While this simulation illustrates that there is a limit to the amount of curvature change that can accurately be followed in one time step, it also shows good prediction results for a this trail was 12.7%, though the number decreases to 11.9% when the largest outlier is removed.

Figure 18A:
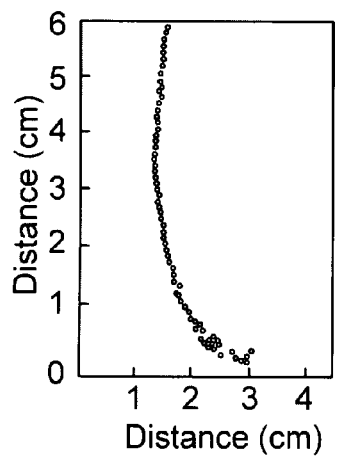
FIG. 18a is a plot of predicted contact points mapped onto the test object where spacing of contact points is small relative to object size.
Figure 18B:
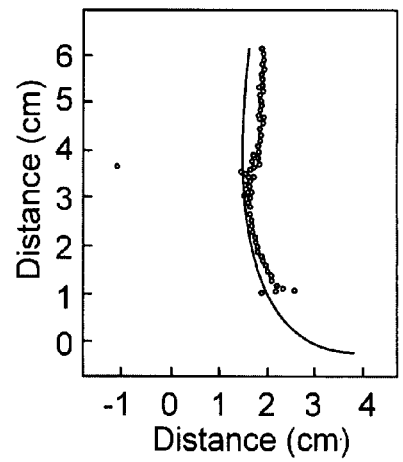
FIG. 18b is a plot of predicted contact points mapped onto the test object where spacing of contact points is large relative to object size. Average error is 12.7%.

To validate the simulation, two cases were tested using an object very similar to the simulated spiral. FIGS. 18a, 18b show the predicted future contact points when the whisker array was passed by the spiral-like object with gradually changing curvature. FIG. 18a shows a trial using single whisker prediction. The average prediction error of 0.97% is very similar to the average error for an object with constant curvature (~1.2%). In FIG. 18b, the whisker basepoints were evenly spaced at 1 cm intervals. This increase in spacing resulted in an increase in prediction error. Since the gradual change in curvature is from high curvature to lower curvature, the predicted future contact points lie mostly inside the actual curve. Average error for this trial was 12.7%, though that number decreases to 11.9% when the largest outlier is removed.

APPENDIX

1. Derivation of the Relationship Between γ and θ

Application of linear elasticity to small angle deflections of a cantilever beam shows that the deflected shape due to a concentrated end load F can be expressed as $$y(x) = \left(\frac{F}{6EI}\right)(3x^2 d_x - x^3) \tag{A1}$$

and the slope is given by $$\frac{dy}{dx} = \left(\frac{F}{6EI}\right)(6x d_x - 3x^2). \tag{A2}$$

Evaluating Eqs. (A1) and (A2) at $x=d_x$, we have $$y(d_x) = d_y = \left(\frac{F d_x^3}{3EI}\right) \tag{A3}$$

and $$\left.\frac{dy}{dx}\right|_{d_x} = \left(\frac{F d_x^2}{2EI}\right). \tag{A4}$$

We also know that tan $$\tan\theta = \left(\frac{-d_y}{d_x}\right)$$

and tan $$\tan\gamma = \left.\frac{-dy}{dx}\right|_{d_x}.$$

Using these equations along with Eqs. (A3) and (A4) gives us $$\tan\theta = \left(\frac{-F d_x^2}{3EI}\right) \tag{A5}$$

and $$\tan\gamma = \left(\frac{-F d_x^2}{2EI}\right). \tag{A6}$$

For small angles, $\tan\theta \approx \theta$ and $\tan\gamma \approx \gamma$, leading to $$\gamma \approx \frac{3}{2}\theta. \tag{5}$$

2. Determining the Shape of a Cantilever Beam for Large Deflections

The problem of determining the shape of a cantilever beam subjected to a point load at the end is one of the oldest in the study of bending beams, having been investigated by Bernoulli and Euler in the 1700's. Precise solutions can be obtained through the use of elliptic functions [14], and recent methods allow the determination of all equilibrium shapes for given material and geometric properties and end load [15, 16]. Here, we are interested only in determining a small subset of possible equilibrium shapes, namely those that can be expected to arise during a whisker rotation of reasonable amplitude against on object. It is assumed that dynamic effects are negligible, allowing use of a standard elastic model of beam bending.

The Euler-Bernoulli beam equation can be written as:

$$d\kappa = \frac{M}{EI} \tag{A7}$$

where dκ represents change in curvature, and can vary with M, E and I along the length of the beam. Computation of the shape of a cantilever beam for an end load of arbitrary magnitude and direction can be accomplished by dividing the beam into n nodes and writing Eq. (A7) in the following form:

$$d\kappa_i = \frac{d\phi_i}{ds} = \frac{\bar{r}_i \times \bar{F}}{E_i I_i} \tag{A8}$$

where ϕ is the tangent angle of the beam, s is the arc length coordinate, $\bar{r}$ is a moment arm, and $\bar{F}$ is the end load. Subscript i refers to the node number, which we define as 1 at the location of F and n at the beam base. By starting a node 1 and repeatedly calculating the location of the next node up until n, Eq. (A8) provides an accurate, efficient, compact and easy-to-implement way of computing the shape of a beam due to an end load. Note that the generality of this method allows arbitrary inclination of the force, arbitrary variation of E and I along the length, and arbitrary inherent curvature of the beam (so long as the radius of curvature is at least 10 times the beam depth (i.e., the beam diameter in this case) at all nodes [17]).

Figure 10:
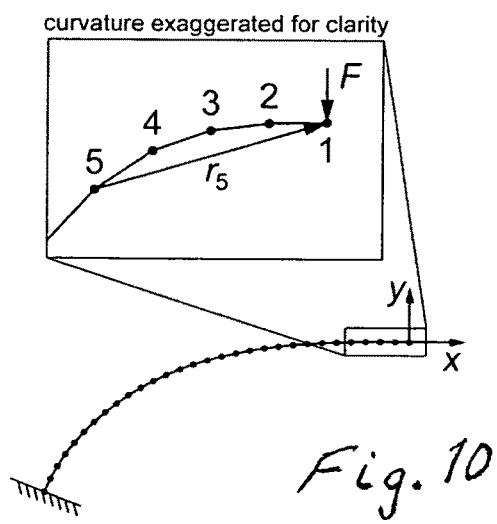
FIG. 10 illustrates the deflected shape of an inherently straight cantilever beam with a concentrated end load F acting perpendicular to the beam's longitudinal axis can be found using a simple iterative procedure depicted here. Only 30 beam nodes are shown for clarity, but a much larger number should be used for accurate results.

In this application the beam is straight and has constant E and I; therefore Eq. (A8) is particularly straightforward to implement using a finite difference method. We assume that the friction between object and beam is negligible, making the force perpendicular to the beam's longitudinal axis at the contact point. FIG. 10 depicts the process of computing the beam shape for a force F. The procedure starts by placing node 1 at (0, 0) and node 2 at (−ds, 0), where ds=1/(n−1) such that F acts at arc length $s_F$=1 along the beam and the initial tangent angle $\phi_1$=0. Successive node locations are then found by looping through the following equations, starting at i=2 and ending at i=n−1:

$$\kappa_{i-1} = x_i \cdot F \tag{A9}$$

$$\phi_i = \phi_{i-1} - \kappa_{i-1} \cdot ds \tag{A10}$$

$$x_{i+1} = x_i - ds \cdot \cos\phi_i \tag{A11}$$

$$y_{i+1} = y_i - ds \cdot \sin\phi_i. \tag{A12}$$

Once the beam shape is computed, its base point is translated to the origin, and it is rotated about its base by angle $-\phi_{n-1}$ to orient it as shown in FIG. 2. Note that EI has been assumed to be 1, meaning that F is effectively normalized by $s_F^2/EI$. Also note that Eq. (A8) could alternatively be easily implemented using a numerical integration algorithm, such as the Runge-Kutta method.

Figure 11:
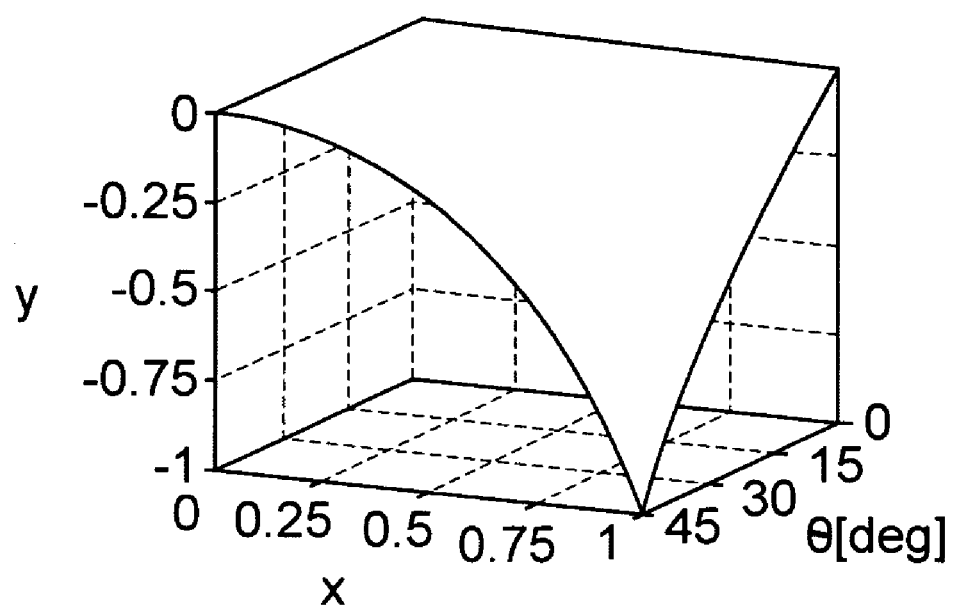
FIG. 11 shows a continuum of beam shapes up to $\theta_{max}=45°$, computed by using the method depicted in FIG. 8. Each beam length was normalized such that $d_x=1$.

Repeating the above process for a succession of forces ranging from 0 to $F_{max}$ and storing the resulting beam shapes in a 2D matrix amounts to pre-solving for all equilibrium shapes up to some maximum value of $\theta$, $\theta_{max}$ (which depends on $F_{max}$). FIG. 11 shows these results for $F_{max}=2.5$, which leads to $\theta_{max} \approx 45°$. A total of 10,000 nodes were used for high accuracy in computing the shapes, but only a subset of these points need to be stored in the look-up table because the underlying curves are smooth. Similarly, the beam changes in a very continuous manner as F is increases, necessitating that only relatively small number of shapes be stored. A table of size 100×100 provides excellent accuracy.

In general, one may wish to obtain the equilibrium shape, curvature or moment at the base, and contact angle $\gamma$ based on various methods of query. In particular, $(d_x, d_y)$, $(r, \theta)$, and $(s_F, F, EI)$, where $s_F$ is the actual location of the force, all independently provide sufficient information to reconstruct the entire shape of the beam by interpolating the look-up table and scaling the units to match those provided in the query.

3. Derivation of Translational Version of Sweeping Algorithm

The first modification involves the radial distance extraction component of the algorithm to reflect the translational movement of the whisker. Defining $\Delta_0$ as the pushing distance, the translational analog of Eq. (1) can be found by substituting $\alpha_0 = \Delta_0/r_0$ and solving for $r_0$, yielding $$r_0 = \sqrt{3EI \frac{\Delta_0}{M_0}}. \tag{A13}$$

Recalling Eq. (3)

$$\begin{bmatrix} d_{x,i+1} \\ d_{y,i+1} \end{bmatrix} = \begin{bmatrix} d_{x,i} \\ d_{y,i} \end{bmatrix} + \overline{\delta}_i + \overline{ds}_i, \tag{3}$$

again the task is to find expressions for $\overline{\delta}_i$ and $\overline{ds}_i$. The nominal deflection component $\overline{\delta}_i$ is simply opposite to the translational movement of the whisker:

$$\overline{\delta}_i = \begin{bmatrix} 0 \\ -\Delta_i \end{bmatrix}. \tag{A14}$$

The longitudinal slip component $\overline{ds}_i$ is not influenced by the change from rotational whisker movement to translational, and remains the same. Eq. (9) now becomes $$\begin{bmatrix} d_{x,i+1} \\ d_{y,i+1} \end{bmatrix} = \begin{bmatrix} d_{x,i} \\ d_{y,i} \end{bmatrix} + \begin{bmatrix} 0 \\ -\Delta_i \end{bmatrix} + (M_{i+1} - M_{\delta,i}) \cdot \frac{ds}{dM_i} \cdot \begin{bmatrix} -\cos\left(\frac{3}{2}\theta_i\right) \\ \sin\left(\frac{3}{2}\theta_i\right) \end{bmatrix}. \tag{A15}$$

Although the invention has been described above with respect to certain embodiments, those skilled in the art will appreciate that modifications and changes can be made therein within the scope of the invention as set forth in the appended claims.

REFERENCES

[1] G. Dehnhardt, B. Mauck, W. Hanke, and H. Bleckmann, "Hydrodynamic trail-following in harbor seals (Phoca vitulina)," *Science*, vol. 293, pp. 102-104, Jul. 6, 2001.

[2] D. J. Krupa, M. S. Matell, A. J. Brisben, L. M. Oliveira, and M. A. L. Nicolelis, "Behavioral properties of the trigeminal somatosensory system in rats performing whisker-dependent tactile discriminations," *Journal of Neuroscience*, vol. 21, pp. 5752-5763, Aug. 1, 2001.

[3] J. H. Solomon and M. J. Z. Hartmann, "Artificial whiskers suitable for array implementation: Accounting for lateral slip and surface friction," *IEEE Transactions on Robotics*, vol. 24, pp. 1157-1167, 2008.

[4] T. Tsujimura and T. Yabuta, "Object detection by tactile sensing method employing force/torque information," *IEEE Transactions on Robotics and Automation*, vol. 5, pp. 444-450, August 1989.

[5] N. Ueno, M. Svinin, and M. Kaneko, "Dynamic contact sensing by flexible beam," *IEEE/ASME Transactions on Mechatronics*, vol. 3, pp. 254-264, April 1998.

[6] M. Kaneko, N. Kanayama, and T. Tsuji, "Active antenna for contact sensing," *IEEE Transactions on Robotics and Automation*, vol. 14, pp. 278-291, April 1998.

[7] T. N. Clements and C. D. Rahn, "Three dimensional contact imaging with an actuated whisker," *IEEE Transactions on Robotics*, vol. 22, pp. 844-848, 2006.

[8] D. Kim and R. Möller, "Biomimetic whiskers for shape recognition," *Robotics and Autonomous Systems*, vol. 55, pp. 229-243, March 2007.

[9] J. H. Solomon and M. J. Hartmann, "Robotic whiskers used to sense features," *Nature*, vol. 443, p. 525, Oct. 5, 2006.

[10] R. A. Russell, "Using tactile whiskers to measure surface contours," in *Proceedings of the 1992 IEEE International Conference on Robotics and Automation*, Nice, France, 1992, pp. 1295-1299.

[11] J. Wilson and Z. Chen, "A whisker probe system for shape perception of solids," *ASME Journal of Dynamic Systems, Measurement, and Control*, vol. 117, pp. 104-108, 1995.

[12] G. R. Scholz and C. D. Rahn, "Profile sensing with an actuated whisker," *IEEE Transactions on Robotics and Automation*, vol. 20, pp. 124-127, February 2004.

[13] R. B. Towal and M. J. Z. Hartmann, "Variability in velocity profiles during free-air whisking behavior of unrestrained rats," *Journal of Neurophysiology*, vol. 100, pp. 740-752, 2008.

[14] L. D. Landau and E. M. Lifshitz, *Theory of Elasticity*, 3rd ed. Oxford, England: Pergamon Press, 1986.

[15] M. Batista and F. Kosel, "Cantilever beam equilibrium configurations," *International Journal of Solids and Structures*, vol. 42, pp. 4663-4672, 2005.

[16] S. Navee and R. E. Elling, "Equilibrium configurations of cantilever beams subjected to inclined end loads," *Transactions of the ASME Journal of Applied Mechanics*, vol. 59, pp. 572-579, 1992.

[17] W. Young and R. Budynas, *Roark's Formulas for Stress and Strain*, 7th ed. New York: McGraw-Hill Professional, 2001.

The invention claimed is:

1. A method for sensing an object profile shape, comprising relatively sweeping an elongated whisker element having a deflectable cantilever region and an object so that the cantilever region bends as a result of sliding on an object periphery, determining moment at a base region of the whisker element as a result of the bending, and iteratively inferring successive contact point locations on the object periphery based on small successive increments in whisker element displacement and sensed moment.

2. The method of claim 1 wherein the whisker element displacement comprises rotational displacement in angular increments.

3. The method of claim 1 wherein the whisker element displacement comprises translational displacement in translational increments.

4. The method of claim 1 including determining moment using a strain gage.

5. The method of claim 4 wherein the strain gage is disposed on a mounting body on which the base region of the whisker element is disposed.

6. The method of claim 1 wherein the whisker element comprises an elastic metallic wire.

7. The method of claim 1 wherein the whisker element is rotated or translated relative to the object to effect sweeping movement.

8. The method of claim 1 including relatively sweeping the whisker element and the object so that the whisker element slides across the object's outer periphery.

9. The method of claim 8 wherein the object is rotated and/or translated between sweeps.

10. A method for sensing curvature of an object, comprising relatively sweeping at a known velocity an elongated whisker element having a deflectable cantilever region and an object so that the cantilever region bends as a result of sliding on an object periphery, determining successive radial distances between a base region of the whisker element and a point of contact with the object, and determining curvature of the object using the successive radial distances and known velocity of sweeping.

11. The method of claim 10 including the step of determining curvature $\kappa$ using $\kappa$ approx.$=d^2y/dx^2$ where x and y represent the estimated x and y coordinates of each point of contact.

12. The method of claim 10 including determining future points of contact between the whisker element and the object by linear approximation using differences of the radial distances and the known velocity at preceding points of contact there between.

13. The method of claim 10 including determining future points of contact between the whisker element and the object by quadratic approximation using curvatures of the object at preceding points of contact there between.

* * * * *